United States Patent
Chen et al.

(10) Patent No.: US 7,247,811 B2
(45) Date of Patent: Jul. 24, 2007

(54) PLASMA WELDING METHOD FOR A GOLF CLUB HEAD

(75) Inventors: Chan-Tung Chen, Kaohsiung (TW); Wei-Ming Lin, Kaohsiung (TW)

(73) Assignee: Nelson Precision Casting Co., Ltd., Kaohsiung (TW)

(*) Notice: Subject to any disclaimer, the term of this patent is extended or adjusted under 35 U.S.C. 154(b) by 0 days.

(21) Appl. No.: 11/225,033

(22) Filed: Sep. 14, 2005

(65) Prior Publication Data

US 2007/0056938 A1    Mar. 15, 2007

(51) Int. Cl.
*B23K 10/00*    (2006.01)
(52) U.S. Cl. ............ 219/121.46; 219/121.45; 219/121.48
(58) Field of Classification Search .......... 219/121.46, 219/121.45, 121.59, 137 R, 121.48, 121.57, 219/121.39, 121.44
See application file for complete search history.

(56) References Cited

U.S. PATENT DOCUMENTS

| | | | |
|---|---|---|---|
| 4,833,295 A * | 5/1989 | Locker et al. ......... | 219/121.63 |
| 5,897,796 A * | 4/1999 | Forrest .................. | 219/121.64 |
| 6,099,414 A | 8/2000 | Kusano et al. | |
| 7,015,417 B2 * | 3/2006 | Takikawa et al. ...... | 219/121.64 |
| 2006/0014594 A1 * | 1/2006 | Hou ..................... | 473/349 |

FOREIGN PATENT DOCUMENTS

| | | |
|---|---|---|
| TW | 585792 A | 5/2004 |
| TW | I225421 B | 12/2004 |
| TW | I226251 B | 1/2005 |

* cited by examiner

*Primary Examiner*—Mark Paschall
(74) *Attorney, Agent, or Firm*—Birch, Stewart, Kolasch & Birch, LLP

(57) ABSTRACT

A plasma welding method for a golf club head includes the steps of: preparing a club head body and a striking plate, and mounting the striking plate to the club head body; moving a plasma nozzle to aim to a connection line formed between the club head body and the striking plate before the plasma welding; tilting the plasma nozzle a predetermined inclined angle with respect to a vertical direction of the combination of the club head body and the striking plate for the plasma welding; and controlling the tilted plasma nozzle to weld the striking plate to the club head body so as to constitute the golf club head.

18 Claims, 7 Drawing Sheets

```
preparing a club head body and a striking plate,
  and mounting the striking plate to the
  club head body;
```
↓
```
moving a plasma nozzle to aim to a connection line
formed between the club head body and the striking
 plate before the plasma welding;
```
↓
```
tilting the plasma nozzle a predetermined inclined angle
with respect to a vertical direction of the combination of
the club head body and the striking plate for the
plasma welding;
```
↓
```
controlling the tilted plasma nozzle to weld the striking
plate to the club head body so as to constitute the golf
club head
```

FIG. 3

PLASMA WELDING METHOD FOR A GOLF CLUB HEAD

BACKGROUND OF THE INVENTION

1. Field of the Invention

The present invention relates to a plasma welding method for a golf club head. Particularly, the present invention relates to the plasma welding method of tilting a plasma nozzle a predetermined angle with respect to the golf club head for avoiding obstruction of a neck portion or a hosel of the golf club head. More particularly, the present invention relates to the plasma welding method for welding on a connection line, within a predetermined section, between a striking plate and a club head body.

2. Description of the Related Art

Referring now to FIGS. 1 and 2, a conventional golf club head includes a club head body 91 and a striking plate 92 mounted to the club head body 91, as disclosed in TWN Patent Pub. No. 585,792, entitled "golf club head and manufacturing method therefor (II)," TWN Patent Pub. No. I225,421, entitled "golf club head structure," TWN Patent Pub. No. I226,251, entitled "connecting structure for a striking plate with a golf club head," and U.S. Pat. No. 6,099,414, entitled "golf club head and method for producing the same" etc. A connection line 93 exists between the club head body 91 and the striking plate 92 which are welded by a suitable welding method. In welding operation, a variety of welding methods, such as tungsten inert gas (TIG) welding, laser welding, plasma welding or other suitable welding methods, may be selectively used.

The above plasma welding may be selected to weld the club head body 91 and the striking plate 92, which carries out advantages of high-energy, high-accuracy, high-speed and high-quality welding, and further minimizes or attenuates a heat affected zone of material in a welding process.

In plasma welding operation, a movable plasma nozzle 94 is disposed on a slide track (not shown) and aligned with the connection line 93 existing between the club head body 91 and the striking plate 92. Subsequently, the plasma nozzle 94 is moved downward to an operating level above the connection line 93, and welded along the connection line 93 by an automatic welding process. The club head body 91 has a neck portion 91 and a hosel 912 connected thereto. It should be noted that the neck portion 911, however, is located between the hosel 912 and the club head body 91 and extended upward from a level of the striking plate 92. The neck portion 911 may unavoidably obstruct or interfere in a runway of the plasma nozzle 94 in the plasma welding since the neck portion 911, to a certain extent, is too close to the connection line 93. Consequently, the plasma nozzle 94 running at the operating level cannot pass through above a section of the connection line 93 adjacent to the neck portion 911 of the club head body 91 due to interference with the neck portion 911.

As explained above, the automatic plasma welding process is only suitable for welding the other section of the connection line 93 away from the neck portion 911 of the club head body 91. Meanwhile, other suitable welding methods, a TIG welding method for example, may be used to manually weld the section of the connection line 93 adjacent to the neck portion 911 of the club head body 91. Such welding method may cause poor quality, increased deformation and low efficiency of welding on the connection line 93 adjacent to the neck portion 911 of the club head body 91. Accordingly, such practice, however, may limit the welding process to carry out to be a complete automatic welding process. Hence, there is a need for improving the plasma welding process for the golf club head.

The present invention intends to provide the plasma welding method of tilting a plasma nozzle a predetermined angle with respect to a golf club head for avoiding obstruction of a neck portion or a hosel of the golf club head in such a way to mitigate and overcome the above problem. This permits the plasma nozzle passing through a connection line adjacent to the neck portion of the golf club head in the plasma welding process. Accordingly, the plasma welding method carries out a complete automatic plasma welding process so as to improve the welding efficiency and quality.

SUMMARY OF THE INVENTION

The primary objective of this invention is to provide a plasma welding method for a golf club head, wherein a plasma nozzle tilts a predetermined angle with respect to a golf club head for avoiding obstruction of a neck portion or a hosel of the golf club head. Thereby, the plasma welding method of the present invention can carry out a completely automatic plasma welding process.

The secondary objective of this invention is to provide the plasma welding method for the golf club head, wherein a receiving groove is formed on a connection line adjacent to the neck portion of the golf club head in aiding the plasma welding. Thereby, the plasma welding method of the present invention can enhance the welding penetration and reliability of the golf club head.

The plasma welding method for the golf club head in accordance with the present invention includes the steps of:

preparing a club head body and a striking plate, and mounting the striking plate to the club head body;

moving a plasma nozzle to aim to a connection line formed between the club head body and the striking plate before the plasma welding;

tilting the plasma nozzle a predetermined inclined angle with respect to a vertical direction of the combination of the club head body and the striking plate for the plasma welding; and controlling the tilted plasma nozzle to weld the striking plate to the club head body so as to constitute the golf club head.

In a separate aspect of the present invention, the plasma welding method further includes the step of forming a section of an inclined surface on an outer circumference of the striking plate.

In a further separate aspect of the present invention, the plasma welding method further includes the step of forming a section of an inclined surface on an inner circumference of a front opening of the club head body.

In a yet further separate aspect of the present invention, the plasma welding method further includes the step of forming a section of an inclined surface on both of the outer circumference of the striking plate and the inner circumference of the front opening of the club head body.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a flow chart of a plasma welding method for a golf club head in accordance with a first embodiment of the present invention;

DETAILED DESCRIPTION OF THE INVENTION

Figure 4:
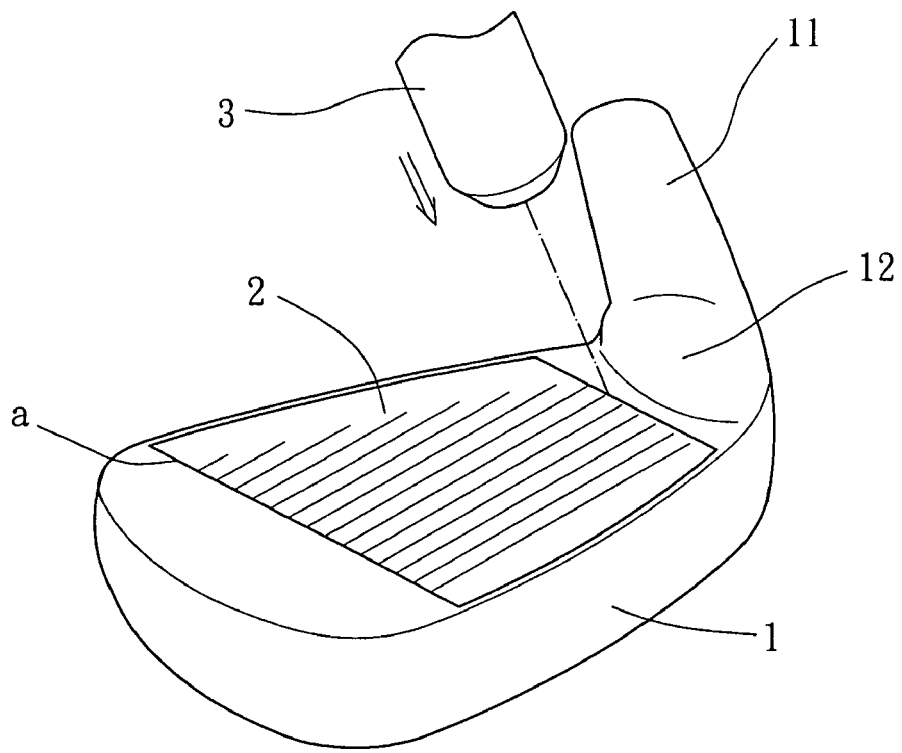
FIG. 4 is a perspective view of the golf club head processing in the plasma welding method in accordance with the first embodiment of the present invention.
Figure 5:
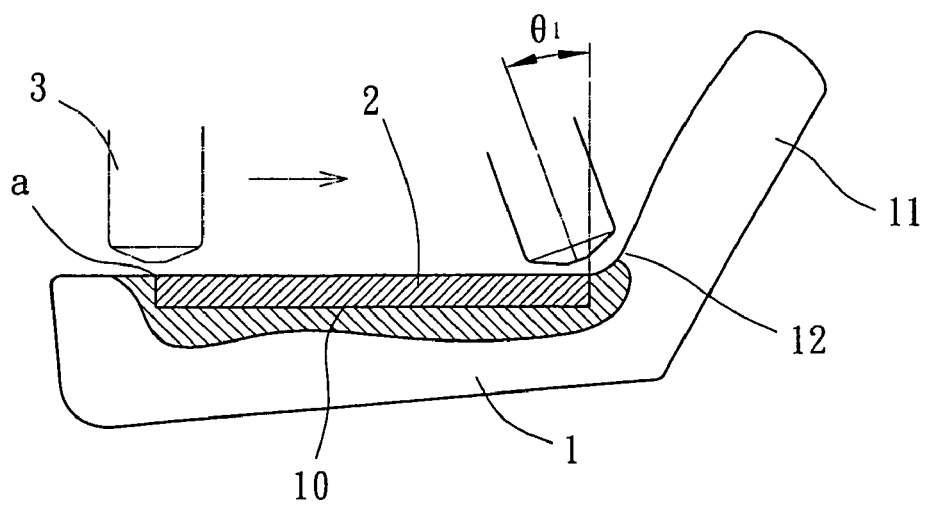
FIG. 5 is a cross-sectional view of the golf club head processing in the plasma welding method in accordance with the first embodiment of the present invention.
Figure 6:
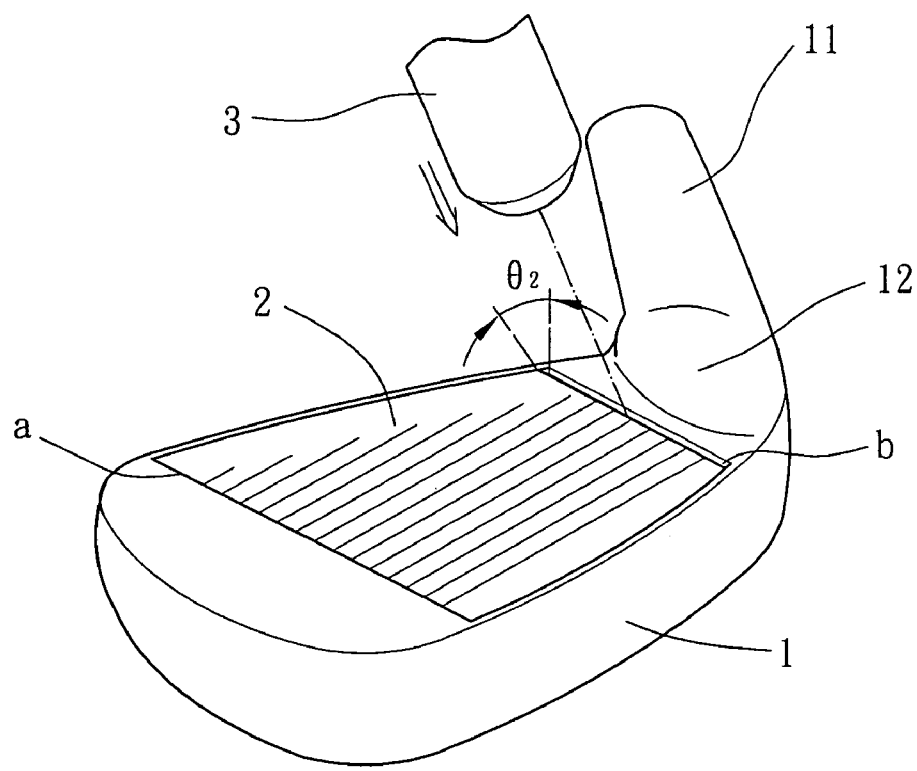
FIG. 6 is a perspective view of the golf club head processing in the plasma welding method in accordance with a second embodiment of the present invention.

Referring now to FIGS. 3 through 5, a golf club head generally includes a club head body member designated numeral 1 and a striking plate member designated numeral 2. The golf club head can be selected from a group consisting of a wood-type club head, an iron-type club head, a utility-type club head and a putter-type club head. In the following embodiments, the plasma welding method in accordance with the present invention shall be only applied to the iron-type club heads. It will be understood that the plasma welding method applied to the wood-type, utility-type or putter-type club head in accordance with the present invention is omitted.

Still referring to FIGS. 3 through 5, the first step in a plasma welding method for the golf club head in accordance with a first embodiment of the present invention is preparing the a club head body (i.e. first club head component) 1 and a striking plate 2 (i.e. second club head component), and then mounting the striking plate 2 to the club head body 1 in the intended manner. In preparing the club head body 1 and striking plate 2, the club head body 1 includes a front opening 10, a hosel (i.e. barrier portion) 11 and a neck portion 12, as best shown in FIG. 5. The front opening 10 is located at a front side of the club head body 1 for receiving the striking plate 2. The hosel 11 is located at a heel side of the club head body 1 for receiving a shaft member (not shown). The neck portion 12 is located at a bent portion formed between the club head body 1 and the hosel 11, and used to connect the hosel 11 to the heel side of the club head body 1. Typically, the club head body 1 extends upward the hosel 11 from the front side where a space receives the striking plate 2. Furthermore, the hosel 11 slants a predetermined angle with respect to a vertical direction of the front side of the club head body 1. Preferably, an outer circumference of the striking plate 2 engages with an inner circumference of the front opening 10 of the club head body 1 adjacent to the toe portion (not labeled), blade portion (not labeled), neck portion 12 and sole portion (not labeled) when assembled. Naturally, a connection line (a) exists between the club head body 1 and the striking plate 2 which can be welded in the following welding step.

Still referring to FIGS. 3 through 5, the second step in the plasma welding method in accordance with the first embodiment of the present invention is moving a plasma nozzle 3 to aim to the connection line (a) formed between the club head body 1 and the striking plate 2 before the plasma welding. In the first embodiment, the plasma nozzle 3 is subsequently moved downward to an operating level above the connection line (a) of the golf club head, and then operated to weld along a section of the connection line (a) away from the neck portion 12 of the club head body 1 by an automatic welding process. In the second step, a section of the connection line (a) adjacent to the neck portion 12 of the club head body 1 has not been welded since the plasma nozzle 3 is limited by the obstruction of the hosel 11 of the club head body 1.

Still referring to FIGS. 3 through 5, the third step in the plasma welding method in accordance with the first embodiment of the present invention is tilting the plasma nozzle 3 a predetermined inclined angle $\theta_1$ with respect to a vertical direction of the combination of the club head body 1 and the striking plate 2 for welding the section of the connection line (a) adjacent to the neck portion 12 of the club head body 1. In this embodiment, the plasma nozzle 3 is a movable plasma nozzle provided on a plasma-welding machine (not shown), and can be traveled along a slide track (not shown). Preferably, the plasma nozzle 3 is still maintained on the operating level above the connection line (a) adjacent to the neck portion 12 of the club head body 1. In order to avoid the obstruction of the hosel 11 of the club head body 1, the plasma-welding machine automatically tilts the plasma nozzle 3 the predetermined inclined angle $\theta_1$ with respect to the vertical direction of the front side of the club head body 1 or the striking plate 2, as shown in FIGS. 4 and 5. Preferably, a plasma spraying aperture of the plasma nozzle 3 is maintained a predetermined distance from the neck portion 12 of the club head body 1, and in the event the tilted plasma nozzle 3 can pass through above the hosel 11 of the club head body 1 for the plasma welding. Preferably, the predetermined inclined angle $\theta_1$ is ranging between 8 degrees and 75 degrees, particularly between 30 degrees and 45 degrees. Alternatively, the plasma nozzle 3 can be tilted and adjusted with respect to the club head body 1 by other suitable mechanism.

Still referring to FIGS. 3 through 5, the fourth step in the plasma welding method in accordance with the first embodiment of the present invention is controlling the tilted plasma nozzle 3 to weld the section of the connection line (a)

adjacent to the neck portion 12 of the club head body 1. In the previous two steps, the plasma nozzle 3 vertically pass through above the section of the connection line (a) away from the neck portion 12 of the club head body 1 for the normal plasma welding process. But, conversely, the plasma nozzle 3 is controlled to tilt the predetermined inclined angle $\theta_1$ with respect to the vertical direction of the front side of the club head body 1 or the striking plate 2. In this step, the plasma-welding machine is controlled to possess the following parameters:

1. A flow of plasma gas is ranging between 1.50 LPM (Liter Per Minute) and 0.15 LPM, preferably 0.30 LPM;
2. A peak value of an electric current is ranging between 120 A and 55 A, preferably 68A;
3. A fundamental electric current is ranging between 22 A and 70 A, preferably 31 A;
4. An output mode of the electric current is a pulse current or a continuous current; and
5. A welding speed is ranging between 5 cm/min and 45 cm/min, preferably 18 cm/min.

In this embodiment, the power of the plasma nozzle 3 is sufficient to weld the section of the connection line (a) adjacent to the neck portion 12 of the club head body 1 such that the welding penetration and reliability may be improved. Alternatively, the plasma-welding machine can weld the connection line (a) of the club head body 1 and the striking plate 2 by a keyhole or non-keyhole type of the plasma welding.

Figure 7:
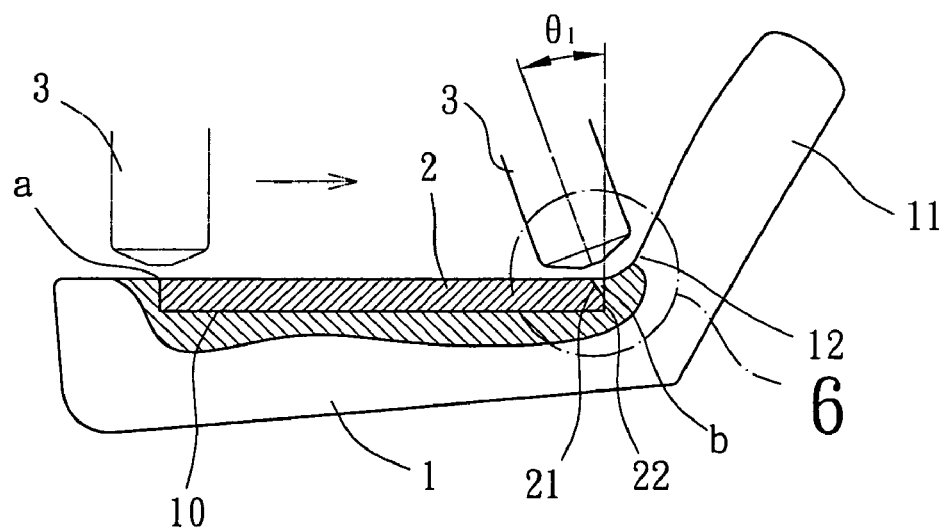
FIG. 7 is a cross-sectional view of the golf club head processing in the plasma welding method in accordance with the second embodiment of the present invention.
Figure 8:
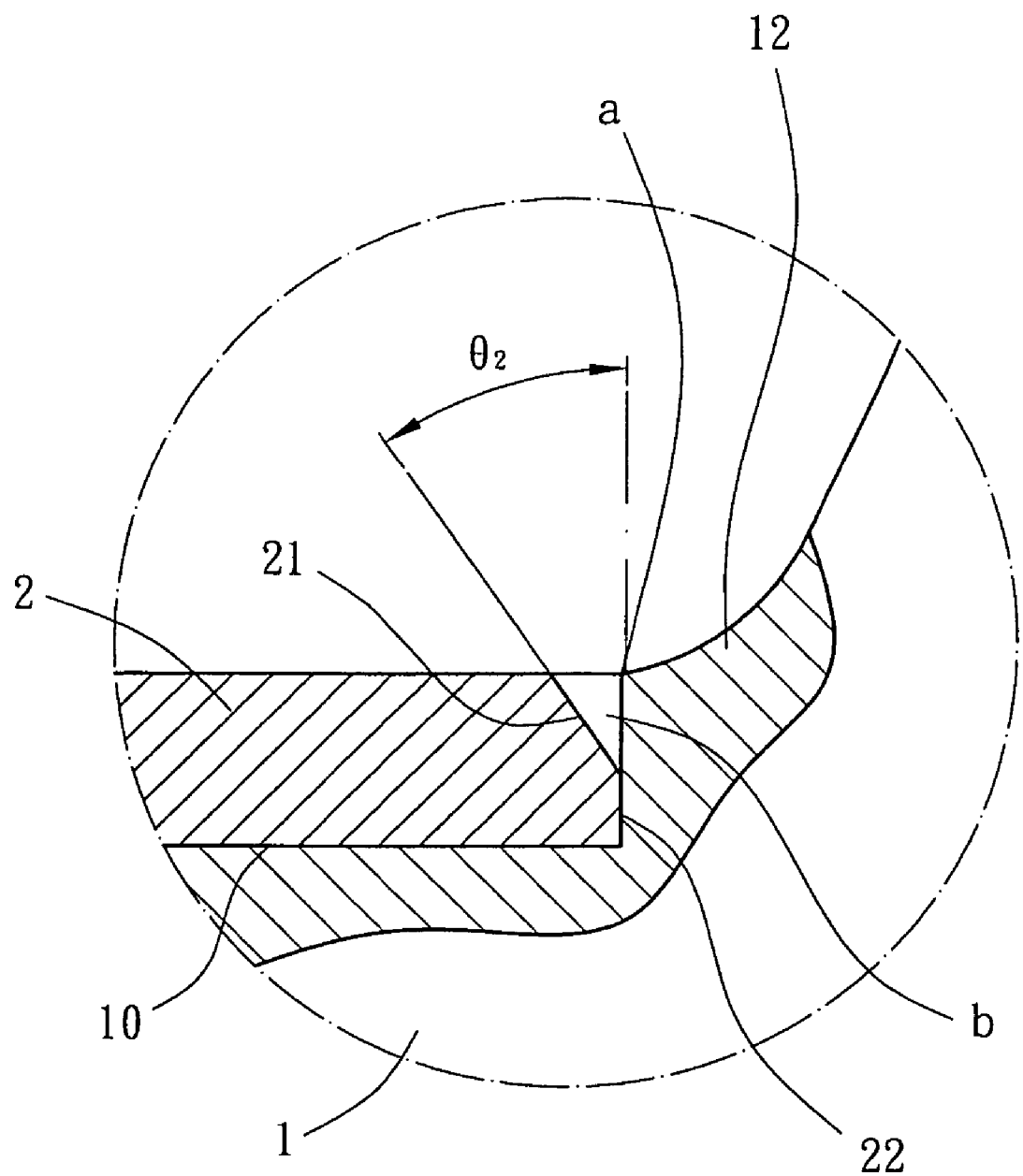
FIG. 8 is an enlarged view, in FIG. 7, of the golf club head processing in the plasma welding method in accordance with the second embodiment of the present invention.
Figure 9:
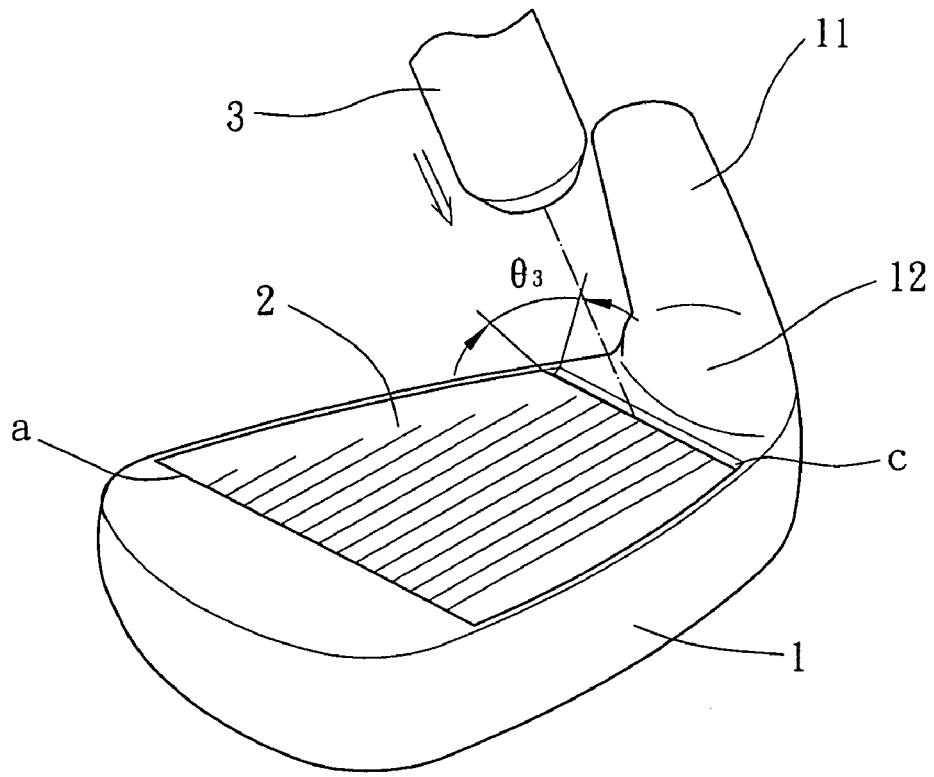
FIG. 9 is a perspective view of the golf club head processing in the plasma welding method in accordance with a third embodiment of the present invention.

Turning now to FIGS. 3 and 6 through 8, the main steps of the plasma welding method in accordance with the second embodiment of the present invention have the same step of the first embodiment. In comparison with the first embodiment, the plasma welding method in accordance with the second embodiment further includes the step of forming an inclined surface 21 on the outer circumference of the striking plate 2, as best shown in FIGS. 7 and 8. In this embodiment, the inclined surface 21 is only formed on the outer circumference of the striking plate 2 adjacent to the hosel 11 of the club head body 1; namely, the inclined surface 21 is only formed on the outer circumference of the striking plate 2 beyond the toe portion of the club head body 1. Accordingly, the inclined surface 21 of the striking plate 2 and the inner circumference of the front opening 10 of the club head body 1 commonly constitute a receiving groove (b) for the plasma welding. In a preferred embodiment, the inclined surface 21 of the striking plate 2 has an inclination of an inclined angle $\theta_2$ with respect to the vertical direction of the front side of the club head body 1 or the striking plate 2. Preferably, the inclined angle $\theta_2$ of the inclined surface 21 of the striking plate 2 is ranging between 10 degrees and 45 degrees, more preferably 30 degrees; namely, the receiving groove (b) has an included angle ranging between 10 degrees and 45 degrees. It should be understood that the inclined angle $\theta_2$ of the inclined surface 21 of the striking plate 2 may be designed somewhat corresponding to the inclined angle $\theta_1$ of the plasma nozzle 3. In addition to a thickness of the inclined surface 21, the outer circumference of the striking plate 2 possesses a thickness of an engaging surface 22 adapted to engage with the inner circumference of the front opening 10 of the club head body 1, as best shown in FIGS. 7 and 8. In this embodiment, a percentage of the thickness of the engaging surface 22 is ranging between 10% and 50%, preferably 20%. In this manner, the receiving groove (b) between the club head body 1 and the striking plate 2 can aid the plasma welding to penetrate the welding line for improving the welding penetration and reliability. In an alternative embodiment, each surface of the front side of the club head body 1 and the striking plate 2 can remain a certain degree of allowance for finish. As a result, surface indents formed on the welding line can be eliminated in a surface-finishing process, subsequent to the plasma welding, to form a golf club head product.

Figure 10:
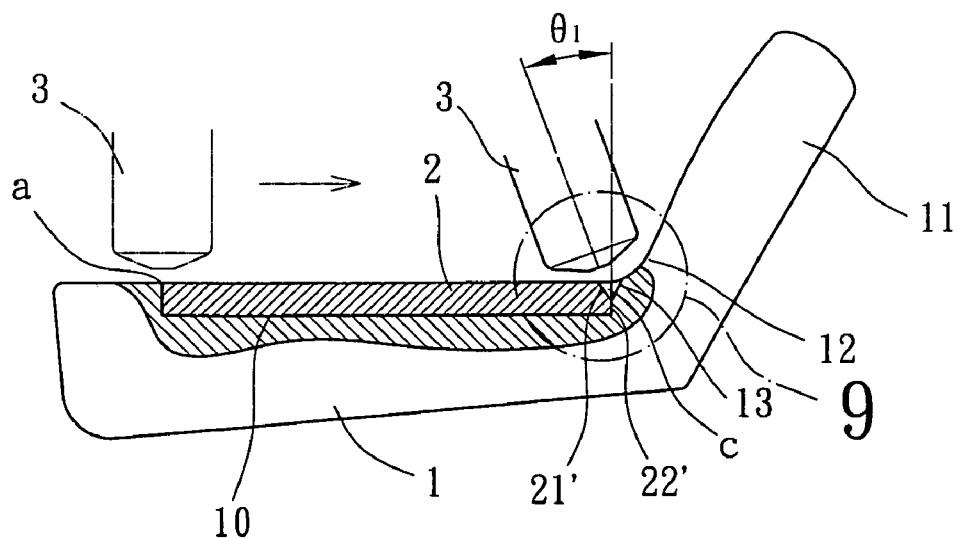
FIG. 10 is a cross-sectional view of the golf club head processing in the plasma welding method in accordance with the third embodiment of the present invention.
Figure 11:
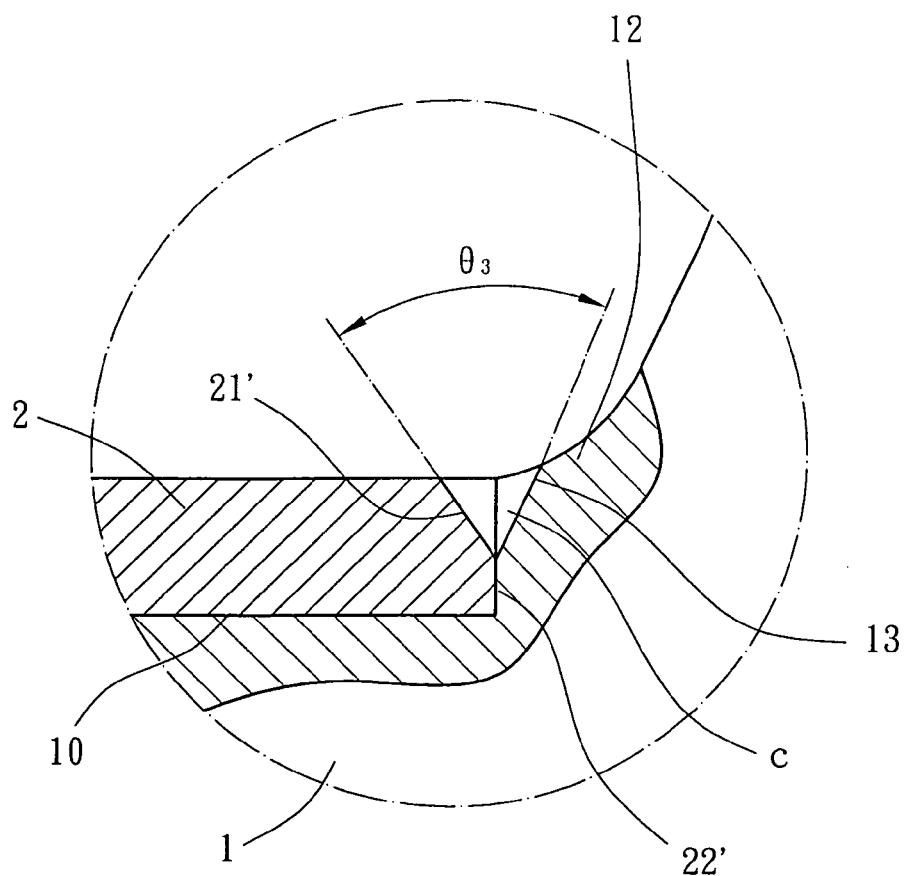
FIG. 11 is an enlarged view, in FIG. 11, of the golf club head processing in the plasma welding method in accordance with the third embodiment of the present invention.

Turning now to FIGS. 3 and 9 through 11, the main steps of the plasma welding method in accordance with the third embodiment of the present invention have the same step of the first embodiment. In comparison with the first and second embodiments, the plasma welding method in accordance with the third embodiment further includes the step of forming an inclined surface 13 on the inner circumference of the front opening 10 of the club head body 1, as best shown in FIGS. 10 and 11. In this embodiment, the inclined surfaces 13, 21' are only formed on the inner circumference of the front opening 10 of the club head body 1 and the outer circumference of the striking plate 2, respectively, adjacent to the hosel 11 of the club head body 1. Accordingly, the inclined surfaces 13 of the inner circumference of the front opening 10 of the club head body 1 and the inclined surface 21' of the striking plate 2 commonly constitute a receiving groove (c) for the plasma welding. In a preferred embodiment, the receiving groove (c) has an included angle $\theta_3$ ranging between 20 degrees and 90 degrees, more preferably 60 degrees. The outer circumference of the striking plate 2 possesses a thickness of an engaging surface 22' adapted to engage with the inner circumference of the front opening 10 of the club head body 1, as best shown in FIGS. 10 and 11. In this embodiment, a percentage of the thickness of the engaging surface 22' is ranging between 10% and 50%, preferably 20%. In this manner, the receiving groove (c) between the club head body 1 and the striking plate 2 can aid the plasma welding to penetrate the welding line for improving the welding penetration and reliability. In an alternative embodiment, each surface of the front side of the club head body 1 and the striking plate 2 can remain a certain degree of allowance for finish. As a result, surface indents formed on the welding line can be eliminated in a surface-finishing process, subsequent to the plasma welding, to form a golf club head product.

In another embodiment, the inclined surfaces 13 of the inner circumference of the front opening 10 of the club head body 1 and the outer circumference of the striking plate 2 commonly constitute a receiving groove (not shown) for the plasma welding. Advantageously, the inclined surfaces 13 of the inner circumference of the front opening 10 of the club head body 1 can aid in guiding the outer circumference of the striking plate 2 to slide into the front opening 10.

Figure 12:
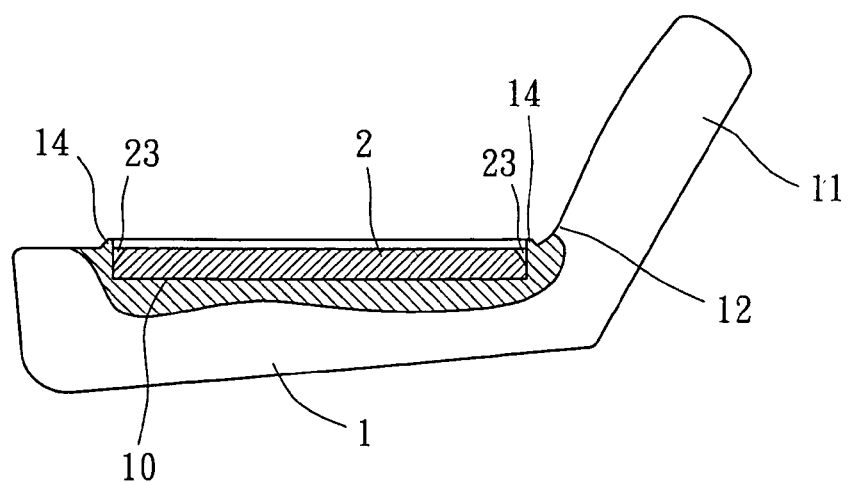
FIG. 12 is a cross-sectional view of the golf club head processing in the plasma welding method in accordance with the fourth embodiment of the present invention.

Turning now to FIG. 12, the main steps of the plasma welding method in accordance with the fourth embodiment of the present invention have the same step of the first embodiment. In comparison with the first through third embodiments, the plasma welding method in accordance with the fourth embodiment further includes the step of forming a filling-material protrusion 14 on a rim of the front opening 10 of the club head body 1 for plasma welding. As such, the filling-material protrusion 14 has a predetermined height on the front opening 10 of the club head body 1 to provide an adequate amount of the filling material in the plasma welding. In this embodiment, a section of the filling-material protrusion 14 is in alignment with a receiving groove 23 adjacent to the heel portion of the club head body 1. In the plasma welding, the filling-material protrusion 14 functions as a filling material to fill into the receiving groove 23 when the striking plate 2 is initially mounted in the front opening 10 of the club head body 1 in the intended manner.

Referring again to FIGS. 3 through 12, the plasma welding method in accordance with the first through fourth embodiment of the present invention can be applied to weld any other club head component or part to the golf club head where the hosel or other club head portion may obstruct or interfere with an operation trajectory of the plasma nozzle 3. For example, the plasma welding method can be used to weld a crown plate (not shown) to a crown portion of the club head body 1; a sidewall plate (not shown) to a skirt portion of the club head body 1; a sole plate (not shown) to a sole portion of the club head body 1; a rear plate (not shown) to a rear portion of the club head body 1; a weight member (not shown) to an assembling hole of the club head body 1; and the hosel 11 to the heel portion of the club head body 1 etc.

Referring again to FIGS. 6 through 11, in an alternative embodiment, the receiving groove (b) or (c) between the club head body 1 and the striking plate 2 may be automatically filled with a suitable filling material or welding material (not shown) prior to the plasma welding process, as best shown in FIGS. 8 and 11.

Figure 1:
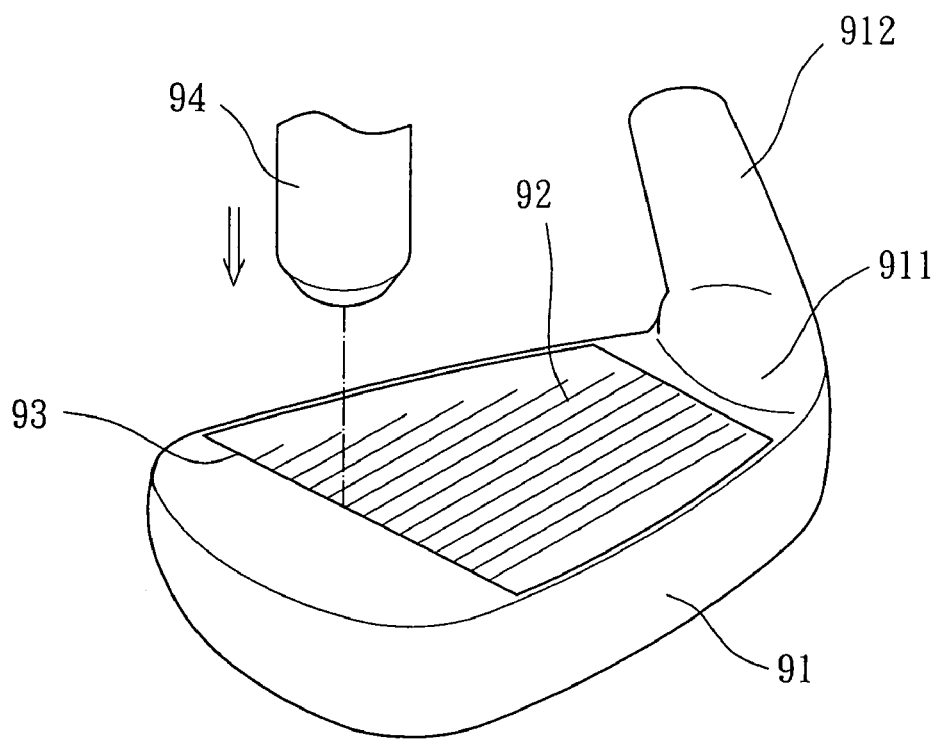
FIG. 1 is a perspective view of a golf club head in a plasma welding process in accordance with the prior art.
Figure 2:
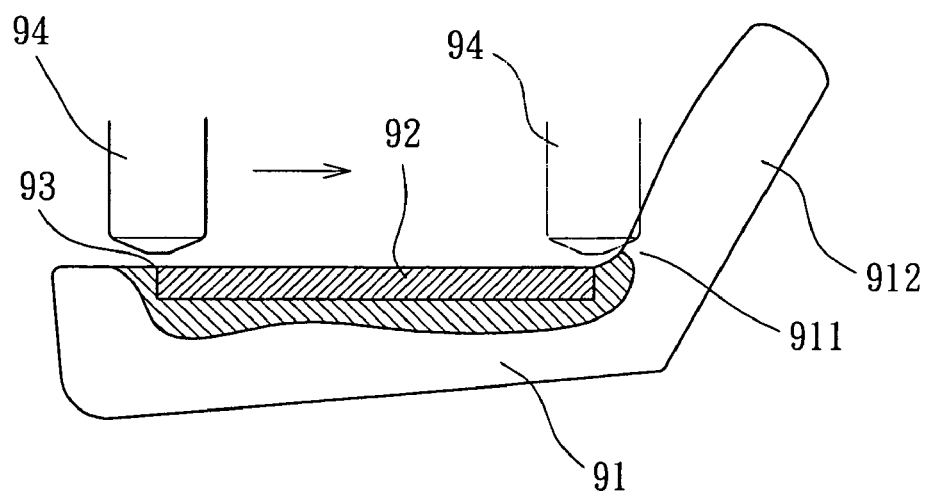
FIG. 2 is a cross-sectional view of the golf club head processing in the plasma welding in accordance with the prior art.

As has been discussed above, the conventional plasma welding method, as shown in FIGS. 1 and 2, cannot apply to the section of the connection line 93 adjacent to the neck portion 911 of the club head body 91. However, the automatic plasma welding process is only suitable for welding the section of the connection line 93 away from the neck portion 911 of the club head body 91. Meanwhile, other suitable welding methods, a TIG welding method for example, may be used to manually weld the section of the connection line 93 adjacent to the neck portion 911 of the club head body 91. Conversely, the plasma welding method in accordance with the present invention, as best shown in FIGS. 5, 7 and 10, can control to tilt the plasma nozzle 3 the predetermined inclined angle $\theta_1$ with respect to the vertical direction of the front side of the club head 1. Thereby, the plasma nozzle 3 can carry out a completely automatic plasma welding process on the entire connection line (a) formed between the club head body 1 and the striking plate 2 so as to improve the welding efficiency or enhance the welding quality and reliability of the golf club head.

In addition, the plasma welding method in accordance with the present invention, as best shown in FIGS. 7 and 10, can further employ suitable mechanical means for forming the receiving groove (b) or (c) on the connection line adjacent to the hosel 11 or the neck portion 12 the of the golf club head in aiding the plasma welding. Preferably, the receiving groove (b) or (c) has an included angle $\theta_2$ or $\theta_3$ within a range of a predetermined angle. Thereby, the completely automatic plasma welding process of the present invention can enhance the welding penetration and reliability of the golf club head.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A plasma welding method for a golf club head, comprising the steps of:
    preparing a club head body and a striking plate, and mounting the striking plate to the club head body between which a connection line is formed, the club head body including a toe portion, a blade portion, a neck portion, a sole portion and a hosel;
    forming an inclined surface on an outer circumference of the striking plate adjacent to the neck portion of the club head body such that a receiving groove is formed on the connection line;
    moving a plasma nozzle to aim to the connection line formed between the club head body and the striking plate before the plasma welding;
    tilting the plasma nozzle a predetermined inclined angle with respect to a direction of the combination of the club head body and the striking plate for the plasma welding such that a trajectory of the plasma nozzle avoids obstruction of the hosel of the club head body; and
    controlling the tilted plasma nozzle to weld the striking plate to the club head body.

2. The manufacturing method for the golf club head as defined in claim 1, wherein the tilted plasma nozzle is used to weld a section of the connection line between the club head body and the striking plate adjacent to the neck portion or the hosel of the club head body.

3. The manufacturing method for the golf club head as defined in claim 1, wherein the inclined angle of the tilted plasma nozzle is ranging between 8 degrees and 75 degrees.

4. The manufacturing method for the golf club head as defined in claim 1, wherein the outer circumference of the striking plate forms an engaging surface adjacent to the inclined surface, and the engaging surface is adapted to engage with an inner circumference of a front opening of the club head body.

5. The manufacturing method for the golf club head as defined in claim 1, further forming a filling-material protrusion on a rim of a front opening of the club head body.

6. The manufacturing method for the golf club head as defined in claim 1, wherein a plasma-welding machine is used to selectively supply a pulse current or a continuous current of an output mode of an electric current for the plasma welding.

7. A manufacturing method for a golf club head comprising the steps of:
    preparing a club head body and a striking plate, and mounting the striking plate to the club head body between which a connection line is formed, the club head body including a toe portion, a blade portion, a neck portion, a sole portion and a hosel;
    forming a first inclined surface on an inner circumference of a front opening of the club head body and forming a second inclined surface on an outer circumference of the striking plate, the first and second inclined surfaces being arranged adjacent to the neck portion of the club head body such that a receiving groove is formed between the first and second inclined surfaces;
    moving a plasma nozzle to aim to the connection line formed between the club head body and the striking plate before the plasma welding;
    tilting the plasma nozzle a predetermined inclined angle with respect to a direction of the combination of the club head body and the striking plate for the plasma welding such that a trajectory of the plasma nozzle avoids obstruction of the hosel of the club head body; and
    controlling the tilted plasma nozzle to weld the striking plate to the club head body.

8. The manufacturing method for the golf club head as defined in claim 7, wherein the outer circumference of the striking plate forms an engaging surface adjacent to the first inclined surface, and the engaging surface is adapted to engage with the inner circumference of the front opening of the club head body.

9. A plasma welding method for a golf club head, comprising the steps of:
preparing a first club head component and a second club head component, and mounting the first club head component to the second club head component between which a connection line is formed, the second club head component including a barrier portion;
forming an inclined surface on the first club head component adjacent to the barrier portion of the second club head component such that a receiving groove is formed on the connection line;
moving a plasma nozzle to aim to the connection line formed between the first and second club head components before the plasma welding;
tilting the plasma nozzle a predetermined inclined angle with respect to a direction of the combination of the first and second club head components for the plasma welding such that a trajectory of the plasma nozzle avoids obstruction of the barrier portion of the first club head component; and
controlling the tilted plasma nozzle to weld the first club head component to the second club head component.

10. The plasma welding method for the golf club head as defined in claim 9, wherein the first club head component is selected from a group consisting of a striking plate, a crown plate, a sidewall plate, a sole plate, a rear plate, a weight member and a hosel.

11. The plasma welding method for the golf club head as defined in claim 9, wherein the second club head component is a club head body.

12. The plasma welding method for the golf club head as defined in claim 9, wherein the tilted plasma nozzle is used to weld a section of the connection line between the first and second club head body components adjacent to the barrier portion of the club head body.

13. The plasma welding method for the golf club head as defined in claim 9, wherein the inclined angle of the tilted plasma nozzle is ranging between 8 degrees and 75 degrees.

14. The plasma welding method for the golf club head as defined in claim 9, wherein the first club head component forms an engaging surface adjacent to the inclined surface, and the engaging surface is adapted to engage with an inner circumference of the second club head component.

15. The plasma welding method for the golf club head as defined in claim 9, wherein a plasma-welding machine is used to selectively supply a pulse current or a continuous current of an output mode of an electric current for, the plasma welding.

16. The plasma welding method for the golf club head as defined in claim 9, wherein the golf club head is selected from a group consisting of a wood-type club head, an iron-type club head, a utility-type club head and a putter-type club head.

17. A plasma welding method for a golf club head, comprising the steps of:
preparing a first club head component and a second club head component, and mounting the first club head component to the second club head component between which a connection line is formed, the second club head component including a barrier portion;
forming a first inclined surface on the first club head component and forming a second inclined surface on the second club head component, the first and second inclined surfaces being arranged adjacent to the barrier portion of the second club head component such that a receiving groove is formed between the first and second inclined surfaces;
moving a plasma nozzle to aim to the connection line formed between the first and second club head components before the plasma welding;
tilting the plasma nozzle a predetermined inclined angle with respect to a direction of the combination of the first and second club head components for the plasma welding such that a trajectory of the plasma nozzle avoids obstruction of the barrier portion of the first club head component; and
controlling the tilted plasma nozzle to weld the first club head component to the second club head component.

18. The plasma welding method for the golf club head as defined in claim 17, wherein the first club head component forms engaging surface adjacent to the first inclined surface, and the engaging surface is adapted to engage with the second club head component.

* * * * *